(12) United States Patent
Riding

(10) Patent No.: US 8,524,137 B2
(45) Date of Patent: Sep. 3, 2013

(54) INJECTION MOLDED ARTICLE AND METHOD FOR THE MANUFACTURE THEREOF

(75) Inventor: Geoffrey Henry Riding, Castleton, NY (US)

(73) Assignee: Sabic Innovative Plastics IP B.V. (NL)

( * ) Notice: Subject to any disclaimer, the term of this patent is extended or adjusted under 35 U.S.C. 154(b) by 237 days.

(21) Appl. No.: 13/116,324

(22) Filed: May 26, 2011

(65) Prior Publication Data

US 2012/0298548 A1  Nov. 29, 2012

(51) Int. Cl.
*B29C 45/00* (2006.01)
*C08L 71/12* (2006.01)

(52) U.S. Cl.
USPC .................. 264/328.1; 206/703; 524/136

(58) Field of Classification Search
USPC .............. 264/328.1; 206/703; 524/136, 141, 524/151
See application file for complete search history.

(56) References Cited

U.S. PATENT DOCUMENTS

| | | |
|---|---|---|
| 3,306,874 A | 2/1967 | Hay |
| 3,383,435 A | 5/1968 | Cizek |
| 3,952,072 A | 4/1976 | Yonemitsu et al. |
| 4,681,906 A | 7/1987 | Abolins et al. |
| 4,900,786 A | 2/1990 | Abolins et al. |
| 5,294,655 A | 3/1994 | Lee, Jr. et al. |
| 5,397,822 A | 3/1995 | Lee, Jr. |
| 5,576,387 A | 11/1996 | Chambers |
| 6,197,869 B1 | 3/2001 | Weber et al. |
| 6,201,067 B1 | 3/2001 | Cheung et al. |
| 6,258,879 B1 | 7/2001 | Adedeji et al. |
| 6,350,514 B1 | 2/2002 | Venderbosch |
| 6,462,167 B1 | 10/2002 | Nodera et al. |
| 7,056,980 B2 | 6/2006 | Adedeji et al. |
| 7,358,293 B2 | 4/2008 | Agarwal |
| 7,519,927 B1 | 4/2009 | Hryckowian et al. |
| 7,790,791 B2 | 9/2010 | Culligan |
| 7,833,470 B2 | 11/2010 | Culligan |
| 2002/0137824 A1 | 9/2002 | Hong et al. |
| 2003/0125430 A1 | 7/2003 | Adedeji et al. |
| 2004/0209968 A1 | 10/2004 | Bastiaens et al. |
| 2005/0080164 A1* | 4/2005 | Gerus et al. .............. 523/171 |
| 2005/0127579 A1 | 6/2005 | Suzuki |

(Continued)

FOREIGN PATENT DOCUMENTS

| | | |
|---|---|---|
| EP | 0747436 A2 | 12/1996 |
| EP | 0747436 A3 | 5/1997 |

(Continued)

OTHER PUBLICATIONS

U.S. Appl. No. 12/254,920 Non-Final Rejection, notification date Feb. 1, 2010, 9 pages.

(Continued)

*Primary Examiner* — Jill Heitbrink
(74) *Attorney, Agent, or Firm* — Cantor Colburn LLP

(57) ABSTRACT

Articles injection molded from colored poly(arylene ether) compositions can exhibit an esthetic defect known as black rings. The black rings can be reduced or eliminated when the poly(arylene ether) composition includes about 50 to about 70 weight percent of a poly(arylene ether), about 12 to about 30 weight percent of a rubber-modified polystyrene, about 5 to about 25 weight percent of an organophosphate ester flame retardant, and a first colorant and a second colorant, wherein the total amount of all colorants is about 0.3 to about 1 weight percent.

14 Claims, 2 Drawing Sheets

(56) References Cited

U.S. PATENT DOCUMENTS

| | | |
|---|---|---|
| 2005/0154100 A1 | 7/2005 | Kosaka et al. |
| 2005/0171266 A1 | 8/2005 | Matthijssen et al. |
| 2006/0058432 A1 | 3/2006 | Perego et al. |
| 2006/0247338 A1* | 11/2006 | Klei et al. ............ 524/89 |
| 2007/0060677 A1 | 3/2007 | Yoshida et al. |
| 2007/0100070 A1 | 5/2007 | Todt et al. |
| 2007/0138702 A9 | 6/2007 | Matthijssen et al. |
| 2007/0249766 A1 | 10/2007 | Ishii et al. |
| 2009/0269659 A1 | 10/2009 | Levasalmi |
| 2009/0326113 A1 | 12/2009 | Fortuyn et al. |
| 2010/0099801 A1 | 4/2010 | Culligan |
| 2010/0139944 A1 | 6/2010 | Guo et al. |
| 2010/0249294 A1 | 9/2010 | Culligan |
| 2011/0003962 A1 | 1/2011 | Carrillo et al. |

FOREIGN PATENT DOCUMENTS

| | | |
|---|---|---|
| EP | 0885929 A1 | 12/1998 |
| WO | 2005097897 A1 | 10/2005 |
| WO | 2009104107 A1 | 8/2009 |
| WO | 2010039470 A3 | 4/2010 |

OTHER PUBLICATIONS

U.S. Appl. No. 12/794,822 Non-Final Rejection, notification date Aug. 3, 2010, 5 pages.

ASTM D1238-10, "Standard Test Method for Melt Flow Rates of Thermoplastics by Extrusion Plastometer", ASTM International, 2010, 15 pages.

ASTM D1510-02a, "Standard Test Method for Carbon Black—Iodine Adsoprtion Number", ASTM International, 2002, 7 pages.

ASTM D2244-09b, "Standard Practice for Calculation of Color Tolerances and Color Differences from Instrumentally Measured Color Coordinates", ASTM International, 2009, 11 pages.

ASTM D256-10, "Standard Test Methods for Determining the Izod Pendulum Impact Resistance of Plastics", ASTM International, 2010, 20 pages.

ASTM D3763-06, "Standard Test Method for High Speed Puncture Properties of Plastics Using Load and Displacement Sensors", ASTM International, 2006, 9 pages.

ASTM D3763-10E1, "Standard Test Method for High Speed Puncture Properties of Plastics Using Load and Displacement Sensors", ASTM International, 2010, 10 pages.

ASTM D3835-02, "Standard Test Method for Determination of Properties of Polymeric Materials by Means of a Capillary Rheometer", ASTM International, 2002, 11 pages.

ASTM D638-10, "Standard Test Methods for Tensile Properties of Plastics", ASTM International, 2010, 16 pages.

ASTM D648-07, "Standard Test Method for Deflection Temperature of Plastics Under Flexural Load in Edgewise Position", ASTM International, 2007, 13 pages.

ASTM D790-10, "Standard Test Methods for Flexural Properties of Unreinforced and Reinforced Plastics and Electrical Insulating Materials", ASTM International, 2010, 11 pages.

Gachter et al. (eds), "Plastics Additives Handbook: Stabilizers, Processing Aids, Plasticizers, Fillers, Reinforcements, Colorants for Thermoplastics", 3rd Edition, Hanswer Publishers, Munich Vienna, New York, 1990, p. 637-677.

ISO 1133, International Standard, "Plastics—Determination of the melt mass-flow rate (MFR) and the melt volume-flow rate (MVR) of thermoplastics", 4th Ed., 2005, 20 pages.

ISO 178, International Standard, Plastics—"Determination of flexural properties", 4th edition, 2001, 23 pages.

ISO 180, International Standard, "Plastics—Determination for Izod impact strength", 3rd ed., 2000, 16 pages.

International Search Report and Written Opinion for PCT/US2009038161, mailing date Nov. 10, 2009, 7 pages.

International Search Report and Written Opinion for PCT/US2009061144, mailing date May 27, 2010, 9 pages.

Morton-Jones, "Polymer Processing", Chapman & Hall, 1989, p. 35.

Written Opinion for PCT/US2009038161, mailing date Nov. 10, 2009, 4 pages.

Written Opinion for PCT/US2009061144, mailing date May 27, 2010, 5 pages.

Encyclopedia Brittanica definition of LLDPE; http://www.britannica.com/EBchecked/topic/342155/linear-low-density-polyethylene; Jun. 17, 2013 4:52:06 PM; 2 pages.

ARKON* P-125 Product Data Sheet, Arakawa Europe, May 2000, 1 page.

JP2008214410 A, Sep. 18, 2008, Abstract Only, 1 page.

International Search Report for International Application No. PCT/US2012/037875, International Application Filing Date May 15, 2012, Date of Mailing Nov. 28, 2012, 5 pages.

Written Opinion for International Application No. PCT/US2012/037875, International Application Filing Date May 15, 2012, Date of Mailing Nov. 28, 2012, 4 pages.

International Search Report for International Application No. PCT/US2012/054556, International Application Filing Date Sep. 11, 2012, Date of Mailing Feb. 13, 2013, 6 pages.

Written Opinion for International Application No. PCT/US2012/054556, International Application Filing Date Sep. 11, 2012, Date of Mailing Feb. 13, 2013, 6 pages.

U.S. Appl. No. 13/247,100, filed Sep. 28, 2011.

* cited by examiner

INJECTION MOLDED ARTICLE AND METHOD FOR THE MANUFACTURE THEREOF

BACKGROUND OF THE INVENTION

Poly(arylene ether)s are a class of plastics known for excellent water resistance, dimensional stability, and inherent flame retardancy, as well as high oxygen permeability and oxygen/nitrogen selectivity. Properties such as strength, stiffness, chemical resistance, and heat resistance can be tailored by blending poly(arylene ether)s with various other plastics in order to meet the requirements of a wide variety of consumer products, for example, plumbing fixtures, electrical boxes, automotive parts, and insulation for wire and cable.

Injection molding compositions including a poly(arylene ether), a rubber-modified polystyrene, and a flame retardant are commonly used to mold a variety of articles. These compositions are often explicitly characterized according to physical properties of molded test articles prepared from them, including objective metrics of stiffness (for example, flexural modulus), ductility (for example, notched Izod impact strength and tensile elongation at break), and heat resistance (for example, heat deflection temperature). Surface esthetics are often an uncommunicated critical-to-quality metric for plastic articles prepared by injection molding. One type of surface defect for injection-molded parts is a variation in color at the portions of the article corresponding to the injection molding gates of the injection molding machine. For example, a darkened ring can appear, as illustrated in FIG. 1. This is particularly a problem for molded parts with large, thin sections, such as, for example, plastic cases for the back-up batteries used in cell phone relay towers. The visual nonuniformities in the molded parts can lead to increased scrap rates and reduced productivity. And when the injection molded article is a case for a lead-acid battery, the presence of darkened rings can raise questions about whether the battery is leaking.

There is therefore a need for molding methods that reduce visual defects in the large, thin sections of articles molded from poly(arylene ether) compositions.

BRIEF DESCRIPTION OF EMBODIMENTS OF THE INVENTION

One embodiment is a method of reducing esthetic defects in an injection molded article, the method comprising: injection molding a poly(arylene ether) composition to form an injection molded article; wherein a portion of the injection molded article comprises a first dimension of at least 10 centimeters, a second dimension of at least 10 centimeters, and a third dimension of less than 1 centimeter; wherein the poly(arylene ether) composition comprises about 50 to about 70 weight percent of a poly(arylene ether) having an intrinsic viscosity of about 0.3 to about 0.55 deciliter/gram measured at 25° C. in chloroform, about 12 to about 30 weight percent of a rubber-modified polystyrene, wherein the rubber-modified polystyrene comprises polystyrene and polybutadiene, about 5 to about 25 weight percent of an organophosphate ester flame retardant, and a first colorant and a second colorant, wherein the total amount of all colorants is about 0.3 to about 1 weight percent; wherein all weight percents are based on the total weight of the poly(arylene ether) composition.

Another embodiment is an injection molded article formed by the above-described method.

These and other embodiments are described in detail below.

DETAILED DESCRIPTION OF THE INVENTION

Figure 1:
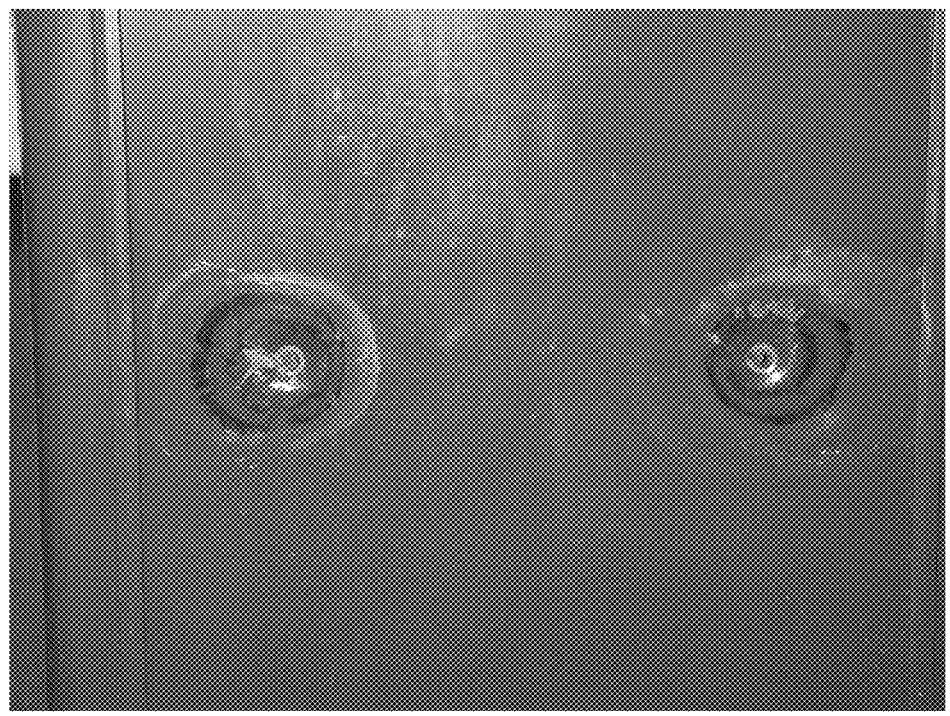
FIG. 1 is an image of black rings on the face of an injection molded article.

When a gray-colored poly(arylene ether) composition was used to injection mold a large, open top rectangular box, the box exhibited black rings at positions associated with the gates of the injection molding machine. FIG. 1 is an image of a box face that exhibits black rings. It was not clear what was causing the black rings. Using the experiments described in the working examples below, it was determined that the black rings could be reduced or eliminated by reducing the concentration of black colorant in the molding composition. While not wishing to be bound by any particular mechanistic hypothesis, the present inventor believes that the black ring is associated with a localized deficiency of white pigment—rather than an excess of black pigment—relative to the bulk composition. This is surprising given that there was no reason to suspect that the injection molding process would cause a segregation (i.e., spatial separation) of individual colorants around the molding gates.

One embodiment is a method of reducing esthetic defects in an injection molded article, the method comprising: injection molding a poly(arylene ether) composition to form an injection molded article; wherein a portion of the injection molded article comprises a first dimension of at least 10 centimeters, a second dimension of at least 10 centimeters, and a third dimension of less than or equal to 1 centimeter; wherein the poly(arylene ether) composition comprises about 50 to about 70 weight percent of a poly(arylene ether) having an intrinsic viscosity of about 0.3 to about 0.55 deciliter/gram measured at 25° C. in chloroform, about 12 to about 30 weight percent of a rubber-modified polystyrene, wherein the rubber-modified polystyrene comprises polystyrene and polybutadiene, about 5 to about 25 weight percent of an organophosphate ester flame retardant, and a first colorant and a second colorant, wherein the total amount of all colorants is about 0.3 to about 1 weight percent; wherein all weight percents are based on the total weight of the poly(arylene ether) composition.

The method requires injection molding a specific poly (arylene ether) composition. The method can utilize conventional injection molding equipment, provided that the equipment has sufficient barrel capacity and tonnage to fill the mold(s) utilized to create the injection molded article. Illustrative equipment and conditions for injection molding are described in the working examples below. In some embodiments, the injection molding comprises filling a barrel of an injection molding machine with the poly(arylene ether) composition and emptying at least 80 weight percent of the barrel to mold a single injection molded article. In some embodiments, injection molding comprises using an injection molding machine with a barrel temperature of about 270 to about 310° C., specifically about 275 to about 300° C., and a mold temperature of about 45 to about 70° C., specifically about 50 to about 65° C.

The method forms an injection molded article. The method is particularly suited to injection molding articles having large, thin sections. Specifically, the injection molded article comprises a portion having a first dimension of at least 10 centimeters, a second dimension of at least 10 centimeters, and a third dimension of less than or equal to 1 centimeter. Thus, the first and second dimensions define the "large" characteristic of the section, and the third dimension defines the "thin" characteristic of the section. The "portion" of the injection molded article can be, for example, one of the five planar faces (excluding the separate top) of a lead-acid battery container. In some embodiments, the first dimension is 10 to about 100 centimeters, the second dimension is 10 to about 100 centimeters, and the third dimension is about 0.02 to 1 centimeter. In some embodiments, the first dimension is about 30 to about 100 centimeters, the second dimension is about 30 to about 100 centimeters, and the third dimension is about 0.1 to about 0.5 centimeter. In some embodiments, the injection molded article is a battery case having a mass of about 1,000 to about 4,000 grams, specifically about 1,500 to about 3,600 grams. Certain smaller battery cases can have a mass of about 1,600 to about 1,800 grams, while certain larger battery cases can have a mass of about 3,200 to about 3,600 grams. In some embodiments, the first and second dimensions define a plane. For example, the molded article can be a battery case having an overall rectangular prism shape in which at least one wall is a (planar) rectangle. In some embodiments, the injection molded article is a case for a lead-acid battery.

The poly(arylene ether) composition comprises a poly(arylene ether). Suitable poly(arylene ether)s include those comprising repeating structural units having the formula

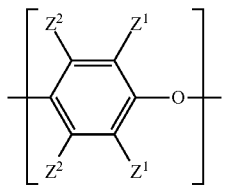

wherein each occurrence of $Z^1$ is independently halogen, unsubstituted or substituted $C_1$-$C_{12}$ hydrocarbyl provided that the hydrocarbyl group is not tertiary hydrocarbyl, $C_1$-$C_{12}$ hydrocarbylthio, $C_1$-$C_{12}$ hydrocarbyloxy, or $C_2$-$C_{12}$ halohydrocarbyloxy wherein at least two carbon atoms separate the halogen and oxygen atoms; and each occurrence of $Z^2$ is independently hydrogen, halogen, unsubstituted or substituted $C_1$-$C_{12}$, hydrocarbyl provided that the hydrocarbyl group is not tertiary hydrocarbyl, $C_1$-$C_{12}$ hydrocarbylthio, $C_1$-$C_{12}$ hydrocarbyloxy, or $C_2$-$C_{12}$ halohydrocarbyloxy wherein at least two carbon atoms separate the halogen and oxygen atoms. As used herein, the term "hydrocarbyl", whether used by itself, or as a prefix, suffix, or fragment of another term, refers to a residue that contains carbon and hydrogen. The residue can be aliphatic or aromatic, straight-chain, cyclic, bicyclic, branched, saturated, or unsaturated. It can also contain combinations of aliphatic, aromatic, straight chain, cyclic, bicyclic, branched, saturated, and unsaturated hydrocarbon moieties. However, when the hydrocarbyl residue is described as substituted, it may, optionally, contain heteroatoms over and above the carbon and hydrogen members of the substituent residue. Thus, when specifically described as substituted, the hydrocarbyl residue can also contain one or more carbonyl groups, amino groups, hydroxyl groups, or the like, or it can contain heteroatoms within the backbone of the hydrocarbyl residue. As one example, $Z^1$ can be a di-n-butylaminomethyl group formed by reaction of a terminal 3,5-dimethyl-1,4-phenyl group with the di-n-butylamine component of an oxidative polymerization catalyst.

The poly(arylene ether) has an intrinsic viscosity of about 0.3 to about 0.55 deciliter/gram measured at 25° C. in chloroform.

In some embodiments, the poly(arylene ether) is characterized by a weight average molecular weight and a peak molecular weight, wherein a ratio of the weight average molecular weight to the peak molecular weight is about 1.3:1 to about 4:1. Within this range, the ratio can be about 1.5:1 to about 3:1, specifically about 1.5:1 to about 2.5:1, more specifically about 1.6:1 to about 2.3:1, still more specifically 1.7:1 to about 2.1:1. The poly(arylene ether) molecular weight distribution is typically analyzed in the molecular weight range from 250 to 1,000,000 atomic mass units. As used herein, the term "peak molecular weight" is defined as the most commonly occurring molecular weight in the molecular weight distribution. In statistical terms, the peak molecular weight is the mode of the molecular weight distribution. In practical terms, when the molecular weight is determined by a chromatographic method such as gel permeation chromatography, the peak molecular weight is the poly(arylene ether) molecular weight of the highest point in a plot of molecular weight on the x-axis versus absorbance on the y-axis. A detailed procedure for determining a molecular weight distribution using gel permeation chromatography is presented in the working examples of International Publication No. WO 2010/039470 A2 of Guo et al.

In some embodiments, the poly(arylene ether) is a poly(2,6-dimethyl-1,4-phenylene ether) prepared with a morpholine-containing catalyst, wherein a purified sample of poly(2,6-dimethyl-1,4-phenylene ether) prepared by dissolution of the poly(2,6-dimethyl-1,4-phenylene ether) in toluene, precipitation from methanol, reslurry, and isolation has a monomodal molecular weight distribution in the molecular weight range of 250 to 1,000,000 atomic mass units, and comprises less than or equal to 2.2 weight percent of poly(2,6-dimethyl-1,4-phenylene ether) having a molecular weight more than fifteen times the number average molecular weight of the entire purified sample. In some embodiments, the purified sample after separation into six equal poly(2,6-dimethyl-1,4-phenylene ether) weight fractions of decreasing molecular weight comprises a first, highest molecular weight fraction comprising at least 10 mole percent of poly(2,6-dimethyl-1,4-phenylene ether) comprising a terminal morpholine-substituted phenoxy group. The poly(2,6-dimethyl-1,4-phenylene ether) according to these embodiments is further described in U.S. Patent Application Publication No. US 2011/0003962 A1 of Carrillo et al.

Figure 2:
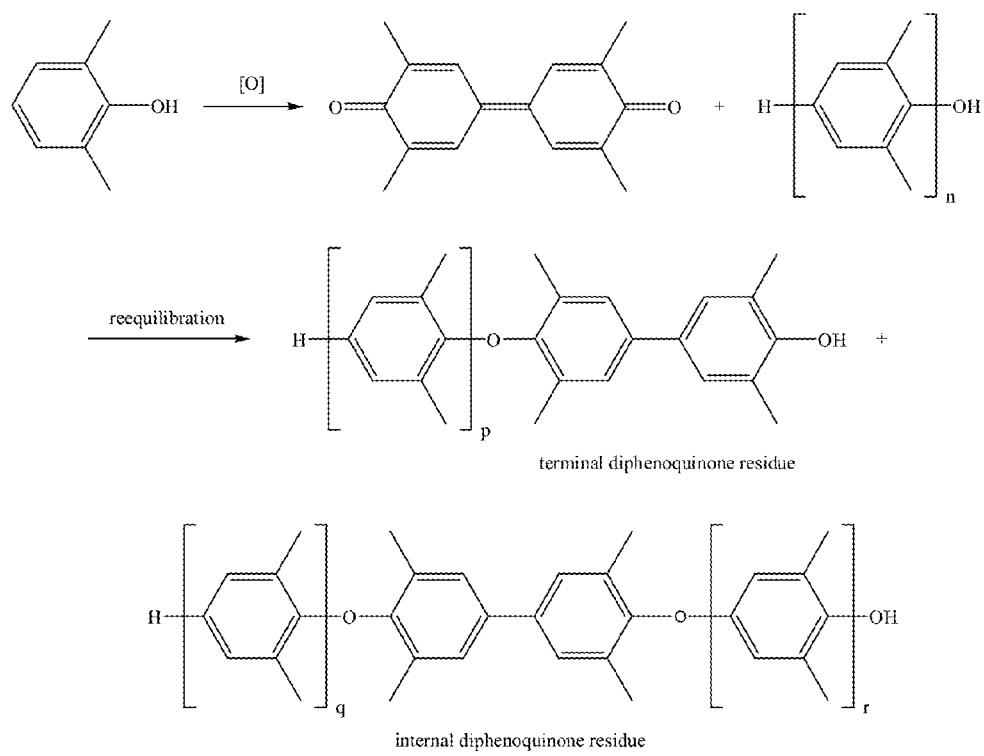
FIG. 2 is a chemical scheme for the preparation of a poly (arylene ether) by oxidative polymerization of 2,6-dimethylphenol to yield poly(2,6-dimethyl-1,4-phenylene ether) and 3,3',5,5'-tetramethyldiphenoquinone; reequilibration of the reaction mixture can produce a poly(arylene ether) with terminal and internal residues of incorporated diphenoquinone.

In some embodiments, the poly(arylene ether) is essentially free of incorporated diphenoquinone residues. In the context, "essentially free" means that the fewer than 1 weight percent of poly(arylene ether) molecules comprise the residue of a diphenoquinone. As described in U.S. Pat. No. 3,306,874 to Hay, synthesis of poly(arylene ether) by oxidative polymerization of monohydric phenol yields not only the desired poly(arylene ether) but also a diphenoquinone as side product. For example, when the monohydric phenol is 2,6-dimethylphenol, 3,3',5,5'-tetramethyldiphenoquinone is generated. Typically, the diphenoquinone is "reequilibrated" into the poly(arylene ether) (i.e., the diphenoquinone is incorporated into the poly(arylene ether) structure) by heating the polymerization reaction mixture to yield a poly(arylene ether) comprising terminal or internal diphenoquinone residues. For example, as shown in the scheme of FIG. 2, when a poly(arylene ether) is prepared by oxidative polymerization of 2,6-dimethylphenol to yield poly(2,6-dimethyl-1,4-phenylene ether) and 3,3',5,5'-tetramethyldiphenoquinone, reequilibration of the reaction mixture can produce a poly (arylene ether) with terminal and internal residues of incorporated diphenoquinone. However, such reequilibration reduces the molecular weight of the poly(arylene ether) (e.g., p and q+r are each less than n). Accordingly, when a higher molecular weight poly(arylene ether) is desired, it may be useful to separate the diphenoquinone from the poly(arylene ether) rather than reequilibrating the diphenoquinone into the poly(arylene ether) chains. Such a separation can be achieved, for example, by precipitation of the poly(arylene ether) in a solvent or solvent mixture in which the poly (arylene ether) is insoluble and the diphenoquinone is soluble. For example, when a poly(arylene ether) is prepared by oxidative polymerization of 2,6-dimethylphenol in toluene to yield a toluene solution comprising poly(2,6-dimethyl-1,4-phenylene ether) and 3,3',5,5'-tetramethyldiphenoquinone, a poly(2,6-dimethyl-1,4-phenylene ether) essentially free of diphenoquinone can be obtained by mixing 1 volume of the toluene solution with about 1 to about 4 volumes of methanol or a methanol/water mixture. Alternatively, the amount of diphenoquinone side-product generated during oxidative polymerization can be minimized (e.g., by initiating oxidative polymerization in the presence of less than 10 weight percent of the monohydric phenol and adding at least 95 weight percent of the monohydric phenol over the course of at least 50 minutes), and/or the reequilibration of the diphenoquinone into the poly(arylene ether) chain can be minimized (e.g., by isolating the poly(arylene ether) no more than 200 minutes after termination of oxidative polymerization). These approaches are described in International Patent Application Publication No. WO2009/104107 A1 of Delsman et al. In an alternative approach utilizing the temperature-dependent solubility of diphenoquinone in toluene, a toluene solution containing diphenoquinone and poly (arylene ether) can be adjusted to a temperature of about 25° C., at which diphenoquinone is poorly soluble but the poly (arylene ether) is soluble, and the insoluble diphenoquinone can be removed by solid-liquid separation (e.g., filtration).

In some embodiments, the poly(arylene ether) comprises 2,6-dimethyl-1,4-phenylene ether units, 2,3,6-trimethyl-1,4-phenylene ether units, or a combination thereof. In some embodiments, the poly(arylene ether) is a poly(2,6-dimethyl-1,4-phenylene ether). In some embodiments, the poly (arylene ether) comprises a poly(2,6-dimethyl-1,4-phenylene ether) having an intrinsic viscosity of about 0.3 to about 0.55 deciliter per gram, specifically about 0.35 to about 0.5 deciliter per gram, more specifically about 0.35 to about 0.46 deciliter per gram, all as measured at 25° C. in chloroform.

The poly(arylene ether) can comprise molecules having aminoalkyl-containing end group(s), typically located in a position ortho to the hydroxy group. Also frequently present are tetramethyldiphenoquinone (TMDQ) end groups, typically obtained from 2,6-dimethylphenol-containing reaction mixtures in which tetramethyldiphenoquinone by-product is present. The poly(arylene ether) can be in the form of a homopolymer, a copolymer, a graft copolymer, an ionomer, or a block copolymer, as well as combinations comprising at least one of the foregoing.

The poly(arylene ether) composition comprises the poly (arylene ether) in an amount of about 50 to about 70 weight percent, based on the total weight of the thermoplastic composition. Within this range, the poly(arylene ether) amount can be about 53 to about 67 weight percent, more specifically about 56 to about 64 weight percent.

In addition to the poly(arylene ether), the poly(arylene ether) composition comprises a rubber-modified polystyrene. The rubber-modified polystyrene comprises polystyrene and polybutadiene. Rubber-modified polystyrenes are sometimes referred to as "high-impact polystyrenes" or "HIPS". In some embodiments, the rubber-modified polystyrene comprises 80 to 96 weight percent polystyrene, specifically 88 to 94 weight percent polystyrene; and 4 to 20 weight percent polybutadiene, specifically 6 to 12 weight percent polybutadiene, based on the weight of the rubber-modified polystyrene. In some embodiments, the rubber-modified polystyrene has an effective gel content of 10 to 35 percent. Suitable rubber-modified polystyrenes are commercially available as, for example, HIPS3190 from SABIC Innovative Plastics, and D7055.5 and D7022.27 from American Styrenics.

The poly(arylene ether) composition comprises the rubber-modified polystyrene in an amount of about 12 to about 30 weight percent, specifically about 14 to about 26 weight percent, more specifically about 16 to about 22 weight percent, based on the total weight of the poly(arylene ether) composition.

In addition to the poly(arylene ether) and the rubber-modified polystyrene, the poly(arylene ether) composition comprises an organophosphate ester flame retardant. Exemplary organophosphate ester flame retardants include phosphate esters comprising phenyl groups, substituted phenyl groups, or a combination of phenyl groups and substituted phenyl groups, bis-aryl phosphate esters based upon resorcinol such as, for example, resorcinol bis(diphenyl phosphate), as well as those based upon bisphenols such as, for example, bisphenol A bis(diphenyl phosphate). In some embodiments, the organophosphate ester is selected from tris(alkylphenyl) phosphates (for example, CAS Reg. No. 89492-23-9 or CAS Reg. No. 78-33-1), resorcinol bis(diphenyl phosphate) (CAS Reg. No. 57583-54-7), bisphenol A bis(diphenyl phosphate) (CAS Reg. No. 181028-79-5), triphenyl phosphate (CAS Reg. No. 115-86-6), tris(isopropylphenyl) phosphates (for example, CAS Reg. No. 68937-41-7), and mixtures thereof.

In some embodiments the organophosphate ester comprises a bis-aryl phosphate having the formula

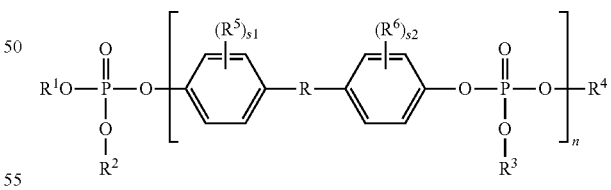

wherein R is independently at each occurrence a $C_1$-$C_{12}$ alkylene group; $R^5$ and $R^6$ are independently at each occurrence a $C_1$-$C_5$ alkyl group; $R^1$, $R^2$, and $R^4$ are independently a $C_1$-$C_{12}$ hydrocarbyl group; $R^3$ is independently at each occurrence a $C_1$-$C_{12}$ hydrocarbyl group; n is 1 to 25; and s1 and s2 are independently an integer equal to 0, 1, or 2. In some embodiments $OR^1$, $OR^2$, $OR^3$ and $OR^4$ are independently derived from phenol, a monoalkylphenol, a dialkylphenol, or a trialkylphenol.

As readily appreciated by one of ordinary skill in the art, the bis-aryl phosphate is derived from a bisphenol. Exemplary bisphenols include 2,2-bis(4-hydroxyphenyl)propane (so-called bisphenol A), 2,2-bis(4-hydroxy-3-methylphenyl) propane, bis(4-hydroxyphenyl)methane, bis(4-hydroxy-3,5-dimethylphenyl)methane and 1,1-bis(4-hydroxyphenyl) ethane. In some embodiments, the bisphenol comprises bisphenol A.

The poly(arylene ether) composition comprises the organophosphate ester flame retardant in an amount of about 5 to about 25 weight percent, specifically about 8 to about 21 weight percent, more specifically about 11 to about 18 weight percent, based on the total weight of the poly(arylene ether) composition.

In addition to the poly(arylene ether), the rubber-modified polystyrene, and the organophosphate ester flame retardant, the poly(arylene ether) composition comprises a first colorant and a second colorant. As described in the working examples below, the inventors have determined that the formation of black rings is associated with the spatial separation of two colorants around the molding gates during injection molding. In some embodiments, the first colorant comprises a white pigment, and the second colorant comprises a black pigment.

Colorants suitable for use as the first colorant or the second colorant include those described in, for example, in R. Gachter and H. Muller, Eds., "Plastics Additives Handbook; Stabilizers, Processing Aids, Plasticizers, Fillers, Reinforcements, Colorants for Thermoplastics; $3^{rd}$ Edition", Munich: Hanser Publishers (1990), pages 637-676. Specific colorants include, for example, carbon black, Pigment Black 11, titanium dioxide, zinc oxide, Disperse Yellow 201, Solvent Green 3, Pigment Green 50, Solvent Red 52, Solvent Red 135, Pigment Red 101, Solvent Violet 13, Disperse Orange 47, Solvent Orange 60, Solvent Blue 104, Pigment Brown 24, and mixtures thereof. In some embodiments, the first colorant comprises titanium dioxide, and the second colorant comprises carbon black.

In some embodiments, the colorant is effective to produce a gray-colored poly(arylene ether) composition and injection molded article. For example, a surface of the injection molded article can exhibit CIE 1976 L* a* b* parameters L* of about 25 to about 45, specifically about 30 to about 40; a* of −10 to about 10, specifically about −5 to about 5; and b* of −10 to about 10, specifically about −5 to about 5; all determined according to ASTM D2244-09b.

The total amount of all colorants in the poly(arylene ether) composition is about 0.3 to about 1 weight percent, specifically about 0.4 to about 0.9 weight percent, more specifically about 0.5 to about 0.8 weight percent, based on the total weight of the poly(arylene ether) composition. Total colorant amounts greater than about 1 weight percent are associated with the formation of visible rings on the surface of the injection molded article. Total colorant amounts less than about 0.3 weight percent can be inadequate to yield the desired appearance of the injection molded article.

In some embodiments, the colorant comprises as the first colorant about 0.25 to about 0.96 weight percent of a white pigment, and as the second colorant about 0.04 to about 0.1 weight percent of a black pigment, based on the total weight of the poly(arylene ether) composition. Within the range of about 0.25 to about 0.96 weight percent, the white pigment amount can be about 0.25 to about 0.8 weight percent, specifically about 0.3 to about 0.6 weight percent, more specifically about 0.35 to about 0.5 weight percent. Within the range of about 0.04 to about 0.1 weight percent, the black pigment amount can be about 0.05 to about 0.08 weight percent. In some embodiments, the white pigment comprises titanium dioxide. In some embodiments, the black pigment comprises carbon black. In some embodiments, the carbon black has an iodine absorption of about 150 to about 500 grams per kilogram as determined by ASTM D1510-02a.

In some embodiments, the poly(arylene ether) composition comprises less than or equal to 0.2 weight percent, specifically less than or equal to 0.1 weight percent, of a poly (ethylene oxide)-poly(propylene oxide) block copolymer, based on the total weight of the poly(arylene ether) composition. In some embodiments, the poly(arylene ether) excludes the poly(ethylene oxide)-poly(propylene oxide) block copolymer. As demonstrated in the working examples below, the presence of a poly(ethylene oxide)-poly(propylene oxide) block copolymer can contribute to the formation of black rings.

The poly(arylene ether) composition can, optionally, further comprise a hydrocarbon resin. Examples of hydrocarbon resins are aliphatic hydrocarbon resins, hydrogenated aliphatic hydrocarbon resins, aliphatic/aromatic hydrocarbon resins, hydrogenated aliphatic/aromatic hydrocarbon resins, cycloaliphatic hydrocarbon resins, hydrogenated cycloaliphatic resins, cycloaliphatic/aromatic hydrocarbon resins, hydrogenated cycloaliphatic/aromatic hydrocarbon resins, hydrogenated aromatic hydrocarbon resins, polyterpene resins, terpene-phenol resins, rosins and rosin esters, hydrogenated rosins and rosin esters, and mixtures thereof. As used herein, "hydrogenated", when referring to the hydrocarbon resin, includes fully, substantially, and partially hydrogenated resins. Suitable aromatic resins include aromatic modified aliphatic resins, aromatic modified cycloaliphatic resins, and hydrogenated aromatic hydrocarbon resins having an aromatic content of about 1 to about 30 weight percent. Any of the above resins may be grafted with an unsaturated ester or anhydride using methods known in the art. Such grafting can provide enhanced properties to the resin. In one embodiment, the hydrocarbon resin is a hydrogenated aromatic hydrocarbon resin.

Suitable hydrocarbon resins are commercially available and include, for example, EMPR 100, 101, 102, 103, 104, 105, 106, 107, 108, 109, 110, 116, 117, and 118 resins, and OPPERA resins, available from ExxonMobil Chemical Company; ARKON P140, P125, P115, M115, and M135, and SUPER ESTER rosin esters available from Arakawa Chemical Company of Japan; SYLVARES polyterpene resins, styrenated terpene resins and terpene phenolic resins available from Arizona Chemical Company; SYLVATAC and SYLVALITE rosin esters available from Arizona Chemical Company; NORSOLENE aliphatic aromatic resins available from Cray Valley; DERTOPHENE terpene phenolic resins and DERCOLYTE polyterpene resins available from DRT Chemical Company; EASTOTAC resins, PICCOTAC resins, REGALITE and REGALREZ hydrogenated cycloaliphatic/ aromatic resins, and PICCOLYTE and PERMALYN polyterpene resins, rosins, and rosin esters available from Eastman Chemical Company; WINGTACK resins available from Goodyear Chemical Company; coumarone/indene resins available from Neville Chemical Company; QUINTONE acid modified C5 resins, C5/C9 resins, and acid-modified C5/C9 resins available from Nippon Zeon; and CLEARON hydrogenated terpene resins available from Yasuhara.

In some embodiments, the hydrocarbon resins have softening points of about 80 to about 180° C., specifically about 100 to about 170° C., more specifically about 110 to about 150° C., and still more specifically about 120 to about 130° C. Softening point is measured as a ring and ball softening point according to ASTM E28-99. A specific hydrocarbon resin is ARKON P125, which has a softening point of about 125° C.

When present in the poly(arylene ether) composition, the hydrocarbon resin is used in an amount of about 1 to about 5 weight percent, specifically about 2 to about 4 weight percent, based on the total weight of the poly(arylene ether) composition.

In some embodiments, the poly(arylene ether) composition further comprises a poly(styrene-acrylonitrile)-encapsulated polytetrafluoroethylene. Polytetrafluoroethylene (PTFE) encapsulated in styrene-acrylonitrile copolymer (SAN) is also known as TSAN. TSAN can be made by polymerizing styrene and acrylonitrile in the presence of polytetrafluoroethylene. In some embodiments, the TSAN comprises about 30 to about 70 weight percent polytetrafluoroethylene and about 30 to about 70 weight percent poly(styrene-acrylonitrile), based on the weight of the poly(styrene-acrylonitrile)-encapsulated polytetrafluoroethylene. In some embodiments, the encapsulating poly(styrene-acrylonitrile) comprises about 50 to about 90 weight percent styrene residues, and about 10 to about 50 weight percent acrylonitrile residues.

When present in the poly(arylene ether) composition, the poly(styrene-acrylonitrile)-encapsulated polytetrafluoroethylene can be used in an amount of about 0.025 to about 0.4 weight percent, specifically about 0.05 to about 0.2 weight percent, based on the total weight of the poly(arylene ether) composition.

In some embodiments, the poly(arylene ether) composition further comprises an ethylene homopolymer. The ethylene homopolymer can have a melt flow rate of about 10 to about 50 grams per 10 minutes measured at 190° C. and a 2.16 kilogram load according to ASTM D1238-10. When present, the ethylene homopolymer can be used in an amount of about 0.5 to about 4 weight percent, specifically about 1 to about 3 weight percent, based on the total weight of the poly(arylene ether) composition.

In some embodiments, the poly(arylene ether) composition further comprises a hydrogenated block copolymer of an alkenyl aromatic compound and a conjugated diene. For brevity, this component is referred to as the "hydrogenated block copolymer". The hydrogenated block copolymer can comprise about 10 to about 90 weight percent of poly(alkenyl aromatic) content and about 90 to about 10 weight percent of hydrogenated poly(conjugated diene) content, based on the weight of the hydrogenated block copolymer. In some embodiments, the hydrogenated block copolymer is a low poly(alkenyl aromatic content) hydrogenated block copolymer in which the poly(alkenyl aromatic) content is about 10 to less than 40 weight percent, specifically about 20 to about 35 weight percent, more specifically about 25 to about 35 weight percent, yet more specifically about 30 to about 35 weight percent, all based on the weight of the low poly(alkenyl aromatic content) hydrogenated block copolymer. In other embodiments, the hydrogenated block copolymer is a high poly(alkenyl aromatic content) hydrogenated block copolymer in which the poly(alkenyl aromatic) content is 40 to about 90 weight percent, specifically about 50 to about 80 weight percent, more specifically about 60 to about 70 weight percent, all based on the weight of the high poly(alkenyl aromatic content) hydrogenated block copolymer.

In some embodiments, the hydrogenated block copolymer has a weight average molecular weight of about 40,000 to about 400,000 atomic mass units. The number average molecular weight and the weight average molecular weight can be determined by gel permeation chromatography and based on comparison to polystyrene standards. In some embodiments, the hydrogenated block copolymer has a weight average molecular weight of about 200,000 to about 400,000 atomic mass units, specifically about 220,000 to about 350,000 atomic mass units. In other embodiments, the hydrogenated block copolymer has a weight average molecular weight of about 40,000 to about 200,000 atomic mass units, specifically about 40,000 to about 180,000 atomic mass units, more specifically about 40,000 to about 150,000 atomic mass units.

The alkenyl aromatic monomer used to prepare the hydrogenated block copolymer can have the structure

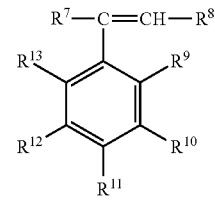

wherein $R^7$ and $R^8$ each independently represent a hydrogen atom, a $C_1$-$C_8$ alkyl group, or a $C_2$-$C_8$ alkenyl group; $R^9$ and $R^{13}$ each independently represent a hydrogen atom, a $C_1$-$C_8$ alkyl group, a chlorine atom, or a bromine atom; and $R^{10}$, $R^{11}$ and $R^{12}$ each independently represent a hydrogen atom, a $C_1$-$C_8$ alkyl group, or a $C_2$-$C_8$ alkenyl group, or $R^{10}$ and $R^{11}$ are taken together with the central aromatic ring to form a naphthyl group, or $R^{11}$ and $R^{12}$ are taken together with the central aromatic ring to form a naphthyl group. Specific alkenyl aromatic monomers include, for example, styrene, chlorostyrenes such as p-chlorostyrene, methylstyrenes such as alpha-methylstyrene and p-methylstyrene, and t-butylstyrenes such as 3-t-butylstyrene and 4-t-butylstyrene. In some embodiments, the alkenyl aromatic monomer is styrene.

The conjugated diene used to prepare the hydrogenated block copolymer can be a $C_4$-$C_{20}$ conjugated diene. Suitable conjugated dienes include, for example, 1,3-butadiene, 2-methyl-1,3-butadiene, 2-chloro-1,3-butadiene, 2,3-dimethyl-1,3-butadiene, 1,3-pentadiene, 1,3-hexadiene, and the like, and combinations thereof. In some embodiments, the conjugated diene is 1,3-butadiene, 2-methyl-1,3-butadiene, or a combination thereof. In some embodiments, the conjugated diene consists of 1,3-butadiene.

The hydrogenated block copolymer is a copolymer comprising (A) at least one block derived from an alkenyl aromatic compound and (B) at least one block derived from a conjugated diene, in which the aliphatic unsaturated group content in the block (B) is at least partially reduced by hydrogenation. In some embodiments, the aliphatic unsaturation in the (B) block is reduced by at least 50 percent, specifically at least 70 percent. The arrangement of blocks (A) and (B) includes a linear structure, a grafted structure, and a radial teleblock structure with or without a branched chain. Linear block copolymers include tapered linear structures and non-tapered linear structures. In some embodiments, the hydrogenated block copolymer has a tapered linear structure. In some embodiments, the hydrogenated block copolymer has a non-tapered linear structure. In some embodiments, the hydrogenated block copolymer comprises a (B) block that comprises random incorporation of alkenyl aromatic monomer. Linear block copolymer structures include diblock (A-B block), triblock (A-B-A block or B-A-B block), tetrablock (A-B-A-B block), and pentablock (A-B-A-B-A block or B-A-B-A-B block) structures as well as linear structures containing 6 or more blocks in total of (A) and (B), wherein the molecular weight of each (A) block can be the same as or different from that of other (A) blocks, and the molecular weight of each (B) block can be the same as or different from that of other (B) blocks. In some embodiments, the hydrogenated block copolymer is a diblock copolymer, a triblock copolymer, or a combination thereof.

In some embodiments, the hydrogenated block copolymer excludes the residue of monomers other than the alkenyl aromatic compound and the conjugated diene. In some embodiments, the hydrogenated block copolymer consists of blocks derived from the alkenyl aromatic compound and the conjugated diene. It does not comprise grafts formed from these or any other monomers. It also consists of carbon and hydrogen atoms and therefore excludes heteroatoms. In some embodiments, the hydrogenated block copolymer includes the residue of one or more acid functionalizing agents, such as maleic anhydride. In some embodiments, the hydrogenated block copolymer comprises a polystyrene-poly(ethylene-butylene)-polystyrene triblock copolymer.

Methods for preparing hydrogenated block copolymers are known in the art and many hydrogenated block copolymers are commercially available. Illustrative commercially available hydrogenated block copolymers include the polystyrene-poly(ethylene-propylene) diblock copolymers available from Kraton Polymers as KRATON G1701 and G1702; the polystyrene-poly(ethylene-butylene)-polystyrene triblock copolymers available from Kraton Polymers as KRATON G1641, G1650, G1651, G1654, G1657, G1726, G4609, G4610, GRP-6598, RP-6924, MD-6932M, MD-6933, and MD-6939; the polystyrene-poly(ethylene-butylene-styrene)-polystyrene (S-EB/S-S) triblock copolymers available from Kraton Polymers as KRATON RP-6935 and RP-6936, the polystyrene-poly(ethylene-propylene)-polystyrene triblock copolymers available from Kraton Polymers as KRATON G1730; the maleic anhydride-grafted polystyrene-poly(ethylene-butylene)-polystyrene triblock copolymers available from Kraton Polymers as KRATON G1901, G1924, and MD-6684; the maleic anhydride-grafted polystyrene-poly(ethylene-butylene-styrene)-polystyrene triblock copolymer available from Kraton Polymers as KRATON MD-6670; the polystyrene-poly(ethylene-butylene)-polystyrene triblock copolymer comprising 67 weight percent polystyrene available from Asahi Kasei Elastomer as TUFTEC H1043; the polystyrene-poly(ethylene-butylene)-polystyrene triblock copolymer comprising 42 weight percent polystyrene available from Asahi Kasei Elastomer as TUFTEC H1051; the polystyrene-poly(butadiene-butylene)-polystyrene triblock copolymers available from Asahi Kasei Elastomer as TUFTEC P1000 and P2000; the hydrogenated radial block copolymers available from Chevron Phillips Chemical Company as K-Resin KK38, KR01, KR03, and KR05; the polystyrene-poly(ethylene-butylene)-polystyrene triblock copolymer comprising 60 weight polystyrene available from Kuraray as SEPTON S8104; the polystyrene-poly(ethylene-ethylene/propylene)-polystyrene triblock copolymers available from Kuraray as SEPTON S4044, S4055, S4077, and S4099; and the polystyrene-poly(ethylene-propylene)-polystyrene triblock copolymer comprising 65 weight percent polystyrene available from Kuraray as SEPTON S2104. Mixtures of two of more hydrogenated block copolymers can be used.

When present in the poly(arylene ether) composition, the hydrogenated block copolymer is used in an amount of about 1 to about 4 weight percent, specifically about 1.5 to about 3 weight percent, based on the total weight of the poly(arylene ether) composition.

In some embodiments, the poly(arylene ether) composition further comprises an aryl phosphite. In general, the aryl phosphite is a phosphite comprising at least one aryloxy group covalently bound to a phosphitic phosphorus atom. In some embodiments, the aryl phosphite has the structure $P(OR^1)_3$, wherein each occurrence of $R^1$ is independently $C_1$-$C_{24}$ hydrocarbyl, provided that at least one occurrence of $R^1$ is an unsubstituted or substituted $C_6$-$C_{24}$ aryl. In some embodiments, each occurrence of $R^1$ is independently an unsubstituted or substituted $C_6$-$C_{24}$ aryl. In some embodiments, the aryl phosphite comprises tris(2,4-di-tert-butylphenyl)phosphite (CAS Reg. No. 31570-04-4). When present in the poly(arylene ether) composition, the aryl phosphite is used in an amount of about 0.1 to about 1 weight percent, specifically about 0.3 to about 0.5 weight percent, based on the total weight of the poly(arylene ether) composition.

The poly(arylene ether) composition can, optionally, further comprise various additives known in the thermoplastics art. For example, the poly(arylene ether) composition can, optionally, further comprise an additive chosen from stabilizers, antioxidants, mold release agents, processing aids, drip retardants, nucleating agents, UV blockers, fragrances, antistatic agents, mineral oil, metal deactivators, antiblocking agents, and the like, and combinations thereof.

Components not taught herein as required or optional can be excluded from the poly(arylene ether) composition.

In some embodiments the poly(arylene ether) composition excludes any polymer other than the poly(arylene ether), the rubber-modified polystyrene, the optional hydrogenated block copolymer, the optional poly(styrene-acrylonitrile)-encapsulated polytetrafluoroethylene, and the optional ethylene homopolymer. In this context, the word "excludes" means that the poly(arylene ether) composition comprises less than or equal to 1 weight percent of the specified polymer, specifically less than or equal to 0.1 weight percent of the specified polymer, more specifically none of the specified polymer. In some embodiments, the poly(arylene ether) composition excludes one or more of polyamides, polyesters, polyolefins, poly(alkenyl aromatic) homopolymers, poly(phenylene sulfide)s, and unhydrogenated block copolymers of an alkenyl aromatic and a conjugated diene.

In some embodiments, the poly(arylene ether) composition excludes alpha-olefin/hindered vinylidene monomer interpolymers. In this context, the word "excludes" means that the poly(arylene ether) composition comprises less than or equal to 1 weight percent alpha-olefin/hindered vinylidene monomer interpolymer, specifically less than or equal to 0.1 weight percent alpha-olefin/hindered vinylidene monomer interpolymer, more specifically no alpha-olefin/hindered vinylidene monomer interpolymer. "Alpha-olefin/hindered vinylidene monomer interpolymers" are copolymers of (1) a vinylidene aromatic monomer or a combination or a vinylidene aromatic monomer and a hindered aliphatic vinylidene monomer, and (2) a $C_2$-$C_{20}$ aliphatic alpha-olefin. These copolymers are further described and exemplified in U.S. Pat. No. 6,201,067 of Cheung et al.

In some embodiments, the poly(arylene ether) composition excludes aromatic amines. In this context, the word "excludes" means that the poly(arylene ether) composition comprises less than 0.1 weight percent aromatic amines, more specifically no aromatic amines As used herein, the term "aromatic amines" refers to a compound in which at least one unsubstituted or substituted phenyl group is bound directly to an amine nitrogen atom. Examples of aromatic amines can be found in U.S. Pat. No. 6,350,514 B1 to Venderbosch.

In some embodiments, the poly(arylene ether) composition excludes fillers. In this context, the word "excludes" means that the poly(arylene ether) composition comprises less than or equal to 5 weight percent filler, specifically less than or equal to 3 weight percent filler, more specifically less than or equal to 1 weight percent filler, more specifically less than or equal to 0.5 weight percent filler, yet more specifically no filler. It will be understood that the exclusion of filler does not exclude small amounts of mineral pigments, such as titanium dioxide, when used to color the composition.

In a very specific embodiment of the method, the first colorant comprises about 0.25 to about 0.94 weight percent of a white pigment, and the second colorant comprises about 0.04 to about 0.1 weight percent of a carbon black; the poly(arylene ether) composition comprises less than or equal to 0.2 weight percent of a poly(ethylene oxide)-poly(propylene oxide) block copolymer; the poly(arylene ether) composition further comprises about 1 to about 5 weight percent of a hydrocarbon resin; the poly(arylene ether) composition further comprises about 0.025 to about 0.4 weight percent of a poly(styrene-acrylonitrile)-encapsulated polytetrafluoroethylene; the poly(arylene ether) composition further comprises about 0.5 to about 4 weight percent of an ethylene homopolymer; the poly(arylene ether) composition further comprises about 1 to about 4 weight percent of a hydrogenated block copolymer of an alkenyl aromatic compound and a conjugated diene; said injection molding comprises using an injection molding machine with a barrel temperature of about 270 to about 310° C. and a mold temperature of about 45 to about 70° C.; and the injection molded article is a case for a lead-acid battery. In some embodiments, a surface of the injection molded article exhibits CIE 1976 L* a* b* parameters L* of about 25 to about 45, a* of −10 to about 10, and b* of −10 to about 10, all determined according to ASTM D2244-09b.

The invention extends to the injection molded articles themselves. Thus, one embodiment is an injection molded article formed by any of the variations of the above-described method.

The invention includes at least the following embodiments.

Embodiment 1: A method of reducing esthetic defects in an injection molded article, the method comprising: injection molding a poly(arylene ether) composition to form an injection molded article; wherein a portion of the injection molded article comprises a first dimension of at least 10 centimeters, a second dimension of at least 10 centimeters, and a third dimension of less than or equal to 1 centimeter; wherein the poly(arylene ether) composition comprises about 50 to about 70 weight percent of a poly(arylene ether) having an intrinsic viscosity of about 0.3 to about 0.55 deciliter/gram measured at 25° C. in chloroform, about 12 to about 30 weight percent of a rubber-modified polystyrene, wherein the rubber-modified polystyrene comprises polystyrene and polybutadiene, about 5 to about 25 weight percent of an organophosphate ester flame retardant, and a first colorant and a second colorant, wherein the total amount of all colorants is about 0.3 to about 1 weight percent; wherein all weight percents are based on the total weight of the poly(arylene ether) composition.

Embodiment 2: The method of embodiment 1, wherein the first colorant comprises a white pigment and the second colorant comprises a black pigment.

Embodiment 3: The method of embodiment 1 or 2, wherein the first colorant comprises about 0.25 to about 1.0 weight percent of a white pigment, and the second colorant comprises about 0.04 to about 0.1 weight percent of a carbon black.

Embodiment 4: The method of any of embodiments 1-3, wherein the poly(arylene ether) composition comprises less than or equal to 0.2 weight percent of a poly(ethylene oxide)-poly(propylene oxide) block copolymer.

Embodiment 5: The method of any of embodiments 1-4, wherein the poly(arylene ether) composition further comprises about 1 to about 5 weight percent of a hydrocarbon resin.

Embodiment 6: The method of any of embodiments 1-5, wherein the poly(arylene ether) composition further comprises about 0.025 to about 0.4 weight percent of a poly(styrene-acrylonitrile)-encapsulated polytetrafluoroethylene.

Embodiment 7: The method of any of embodiments 1-6, wherein the poly(arylene ether) composition further comprises about 0.5 to about 4 weight percent of an ethylene homopolymer.

Embodiment 8: The method of any of embodiments 1-7, wherein the poly(arylene ether) composition further comprises about 1 to about 4 weight percent of a hydrogenated block copolymer of an alkenyl aromatic compound and a conjugated diene.

Embodiment 9: The method of any of embodiments 1-8, wherein said injection molding comprises using an injection molding machine with a barrel temperature of about 270 to about 310° C. and a mold temperature of about 45 to about 70° C.

Embodiment 10: The method of any of embodiments 1-9, wherein the injection molded article is a case for a lead-acid battery.

Embodiment 11: The method of any of embodiments 1-10, wherein a surface of the injection molded article exhibits CIE 1976 L* a* b* parameters L* of about 25 to about 45, a* of −10 to about 10, and b* of −10 to about 10, determined according to ASTM D2244-09b.

Embodiment 12: The method of embodiment 1, wherein the first colorant comprises about 0.25 to about 1.0 weight percent of a white pigment, and the second colorant comprises about 0.04 to about 0.1 weight percent of a carbon black; wherein the poly(arylene ether) composition comprises less than or equal to 0.2 weight percent of a poly(ethylene oxide)-poly(propylene oxide) block copolymer; wherein the poly(arylene ether) composition further comprises about 1 to about 5 weight percent of a hydrocarbon resin; wherein the poly(arylene ether) composition further comprises about 0.025 to about 0.4 weight percent of a poly(styrene-acrylonitrile)-encapsulated polytetrafluoroethylene; wherein the poly(arylene ether) composition further comprises about 0.5 to about 4 weight percent of an ethylene homopolymer; wherein the poly(arylene ether) composition further comprises about 1 to about 4 weight percent of a hydrogenated block copolymer of an alkenyl aromatic compound and a conjugated diene; wherein said injection molding comprises using an injection molding machine with a barrel temperature of about 270 to about 310° C. and a mold temperature of about 45 to about 70° C.; and wherein the injection molded article is a case for a lead-acid battery. A surface of the injection molded article can, optionally, exhibit CIE 1976 L* a* b* parameters L* of about 25 to about 45, a* of −10 to about 10, and b* of −10 to about 10, determined according to ASTM D2244-09b Embodiment 13: An injection molded article formed by the method of any of the preceding embodiments.

Embodiment 14: The injection molded article of embodiment 13, wherein the injection molded article is a case for a lead-acid battery.

The invention is further illustrated by the following non-limiting examples.

EXAMPLES 1 AND 2, COMPARATIVE EXAMPLES 1-8

Thermoplastic compositions were compounded using the components listed in Table 1.

TABLE 1

| Component Designation | Description |
|---|---|
| PPE | Poly(2,6-dimethyl-1,4-phenylene ether), CAS Reg. No. 24938-67-8, having an intrinsic viscosity of 0.40 deciliter per gram as measured in chloroform at 25° C.; obtained as PPO 640 from SABIC Innovative Plastics. |
| Zinc sulfide | Zinc sulfide, CAS Reg. No. 1314-98-3; obtained as SACHTOLITH HD from Sachtleben. |
| Zinc oxide | Zinc oxide, CAS Reg. No. 1314-13-2; obtained as CR-4 from GH Chemicals Ltd. |
| Hydrocarbon resin | Hydrocarbon resin, CAS Reg. No. 123465-34-9; obtained as ARKON P-125 from Arakawa Chemical in pellet form and ground to a powder before use. |
| TSAN | Poly(styrene-acrylonitrile)-encapsulated polytetrafluoroethylene, CAS Reg. No. 9002-84-0; obtained as TSAN from SABIC Innovative Plastics. |
| Polyethylene | Polyethylene (ethylene homopolymer), CAS Reg. No. 9002-88-4, having a melt flow rate of 25 grams per 10 minutes measured at 190° C. and a 2.16 kilogram load according to ASTM D1238-10; obtained as GI2010A from NOVA Chemicals. |
| SEBS 1 | Polystyrene-poly(ethylene-butylene)-polystyrene triblock copolymer, CAS Reg. No. 66070-58-4, having a polystyrene content of about 30%; obtained as KRATON G1650 from Kraton Polymers Ltd. |
| SEBS 2 | Polystyrene-poly(ethylene-butylene)-polystyrene triblock copolymer, CAS Reg. No. 66070-58-4, having a polystyrene content of about 33%; obtained as KRATON G1651 from Kraton Polymers Ltd. |
| Phosphite | Tris(2,4-di-t-butylphenyl) phosphite, CAS Reg. No. 31570-04-4; obtained as IRGAFOS 168 from Ciba Specialty Chemicals Inc. |
| Mold release | Poly(ethylene oxide)-poly(propylene oxide) block copolymer, CAS Reg. No. 9003-11-6; obtained as PLURONIC F 88 from BASF. |
| RDP | Resorcinol bis(diphenyl phosphate), CAS Reg. No. 57583-54-7; obtained as FYROLFLEX RDP from ICL Supresta. |
| HIPS | High-impact polystyrene (rubber-modified polystyrene) having a polystyrene content of about 90 weight percent and a polybutadiene content of 10 weight percent; obtained as HIPS3190 from SABIC Innovative Plastics. |
| HF HIPS | High-flow high-impact polystyrene (rubber-modified polystyrene) having a polystyrene content of about 90 weight percent and a polybutadiene content of about 10 weight percent; obtained as D7055.5 from American Styrenics. |
| Titanium dioxide | Titanium dioxide having an average particle size of 0.2 micrometer; obtained as Ti-Pure R103-15 from DuPont. |
| Carbon black | Carbon black having an iodine absorption of 231 grams per kilogram as determined by ASTM D1510-02a; obtained as MONARCH 800 from Cabot. |
| Solvent green 3 | 1,4-bis-(p-toluidino)-9,10-anthraquinone (CAS Reg. No. 128-80-3); obtained as MACROLEX Green 5B from Lanxess Corp. |
| Pigment green 50 | Pigment Green 50 (cobalt titanate), CAS Reg. No. 68186-85-6; obtained as Green V11633 from Ferro Corp. |
| Pigment red 101 #1 | Pigment red 101 (iron (III) oxide), CAS Reg. No. 1309-37-1; obtained as BAYFERROX 180 M from Lanxess Corp. |
| Pigment red 101 #2 | Pigment red 101 (iron (III) oxide), CAS Reg. No. 1309-37-1, having a predominant particle size of 0.7 micrometer; obtained as BAYFERROX 110M from Lanxess Corp. |
| Pigment brown 24 | Pigment brown 24, CAS Reg. No. 68186-90-3; obtained as K2001FG from BASF. |
| Pigment black 11 | Pigment black 11 (black iron oxide), CAS Reg. No. 1317-61-9; obtained as BK5000HP from Harcross Pigments. |

Compositions are summarized in Table 2, where component amounts are expressed in parts by weight. The compositions were prepared by melt kneading on a Werner & Pfleiderer 53 millimeter co-rotating twin-screw extruder having eleven barrels and a screw length to diameter ratio (L/D) of about 38:1. The extruder was run at a screw rotation rate of 300 rotations per minute and a throughput of about 250 pounds/hour (113 kilograms/hour). Barrel set temperatures were 350° F.-500° F.-500° F.-550° F. (177° C.-260° C.-260° C.-288° C.) from the feedthroat to the die. All components were added to the extruder feed throat except for the resorcinol bis(diphenyl phosphate), which was pumped directly into the extruder between barrels 3 and 4. Extruded strands were cooled in a water bath prior to being chopped with a pelletizer.

Each composition was used to injection mold a small part in the form of an open-top rectangular box. The small part had a bottom face with approximate dimensions 52 centimeters×12.4 centimeters×4.5 millimeters, two larger sides with approximate dimensions 52 centimeters×20.6 centimeters×5.3 millimeters, and two smaller sides with approximate dimensions 20.6 centimeters×12.4 centimeters×4.8 millimeters. Injection molding was carried out on a 500 ton Toyo press. A flat barrel temperature profile of about 277 to 299° C. and tool temperatures of about 49 to 66° C. were employed. Molded battery cases were visually inspected to determine whether rings were visible at the positions corresponding to the injection molding gates.

The Comparative Example 1, Comparative Example 5, and Example 1 compositions were also used to injection mold a large part in the form of an open-top rectangular box. The large part had a bottom face with approximate dimensions 52 centimeters×12.4 centimeters×4.2 millimeters, two larger sides with approximate dimensions 52 centimeters×30 centimeters×6.1 millimeters, and two smaller sides with approximate dimensions 12.4 centimeters×30 centimeters×5.3 millimeters. The injection molding machine and conditions were the same as those described for the small part, and the large parts were similarly visually inspected.

Flexural modulus and flexural strength values, both expressed in megapascals, were measured at 23° C. according to ASTM D790-10. Heat deflection temperature values, expressed in degrees centigrade, were measured at a load of 0.45 megapascals according to ASTM D648-07, Method B. Notched Izod impact strength values, expressed in units of joules per meter, were measured at 23° C. according to ASTM D256-10. Dynatup energy to maximum load, Dynatup energy to failure, and Dynatup total energy, all expressed in units of joules, were measured at 23° C. according to ASTM D3763-10e1; the maximum load associated with the Dynatup energy to maximum load is also reported in units of kilonewtons. Melt mass-flow rates, expressed in units of grams per 10 minutes, were measured at 280° C. and 5 kilogram load according to ASTM D1238-10. Tensile modulus values, expressed in units of megapascals, tensile stress at yield values, expressed in units of megapascals, tensile elongation at yield values, expressed in units of percent, tensile elongation at break values, expressed in units of percent, were measured at 23° C. according to ASTM D638-10.

Results are presented in Table 2. The Comparative Example 1 composition is illustrative of the black ring problem in that it exhibits good physical and flame retardancy properties but exhibited black rings in both the small and large parts. Comparative Example 2 omits all colorants and is thus not a practical formulation for molding gray-colored articles. However, it did not exhibit any discoloration around the molding gates. Comparative Example 3 omits zinc sulfide, zinc oxide, hydrocarbon resin, and mold release additives, uses a high-flow rubber-modified polystyrene instead of a standard polystyrene, and contains a reduced concentration of colorants. It did not exhibit black rings when molded into a small part, but it exhibits reduced ductility. Comparative Example 4 is similar to Comparative Example 3, except that it further contains about 2 weight percent of a hydrogenated block copolymer. Again, no black rings were observed in a small part. However, based on the similar colorant packages in Comparative Examples 3-6, it is expected that the Comparative Example 3 and 4 compositions would exhibit black rings in large parts, as did Comparative Examples 5 and 6. Comparative Example 5 reverts to a standard rubber-modified polystyrene. Black rings were not observed in a small part, but they were observed in a large part. Comparative Example 6 adds about 0.4 weight percent of a mold release agent. Black rings were observed in a small part. Comparative Example 7 uses zinc sulfide rather than titanium dioxide as a white pigment. Black rings were observed in both small and large parts. Comparative Example 8 uses a black iron oxide instead of carbon black. Black rings were observed in both small and large parts.

The Example 1 composition utilizes a reduced colorant level, which includes significantly reduced titanium dioxide and carbon black levels. The battery cases molded from the Example 1 composition exhibit the desired gray color while avoiding the formation of black rings in both the small and large parts. The Example 1 composition also exhibits a desirable balance of physical properties including stiffness, heat resistance, and ductility.

TABLE 2

|  | C. Ex. 1 | C. Ex. 2 | C. Ex. 3 | C. Ex. 4 |
|---|---|---|---|---|
| COMPOSITIONS | | | | |
| PPE | 58.43 | 60.50 | 60.00 | 59.00 |
| Zinc sulfide | 0.13 | 0.10 | 0 | 0 |
| Zinc oxide | 0.13 | 0.10 | 0 | 0 |
| Hydrocarbon resin | 2.90 | 3.00 | 0 | 0 |
| TSAN | 0.12 | 0.10 | 0.10 | 0.10 |
| Polyethylene | 0.97 | 1.00 | 1.50 | 1.50 |
| SEBS 1 | 1.93 | 2.00 | 0 | 0 |
| SEBS 2 | 0 | 0 | 0 | 2.00 |
| Phosphite | 0.19 | 0.20 | 0.20 | 0.20 |
| Mold release | 0.39 | 0.40 | 0 | 0 |
| RDP | 14.11 | 14.60 | 14.57 | 14.57 |
| HIPS | 17.39 | 18.00 | 0 | 0 |
| HF HIPS | 0 | 0 | 22.95 | 21.95 |
| Titanium dioxide | 2.13 | 0 | 0.98 | 0.98 |
| Carbon black | 0.31 | 0 | 0.142 | 0.142 |
| Solvent green 3 | 0 | 0 | 0 | 0 |
| Pigment green 50 | 0.15 | 0 | 0.069 | 0.069 |
| Pigment red 101 #1 | 0.16 | 0 | 0.073 | 0.073 |
| Pigment brown 24 | 0.58 | 0 | 0.266 | 0.266 |
| Pigment black 11 | 0 | 0 | 0 | 0 |
| Pigment red 101 #2 | 0 | 0 | 0 | 0 |
| total | 100.020 | 100.000 | 100.848 | 100.848 |
| PROPERTIES | | | | |
| Black rings in small part? | Yes | No | No | No |
| Black rings in large part? | Yes | — | — | — |
| Flexural modulus, 3.175 mm (MPa) | 366,109 | 378,546 | — | — |
| Flexural strength, 3.175 mm (MPa) | 15,181 | 14,649 | — | — |
| Flexural modulus, 6.35 mm (MPa) | — | — | 404,653 | 391,599 |
| Flexural strength, 6.35 mm (MPa) | — | — | 15,519 | 14,939 |
| Heat deflection temp., 3.175 mm (° C.) | — | 93.9 | 94.7 | 96.6 |
| Heat deflection temp., 6.35 mm (° C.) | 104 | 104 | 103 | 104 |
| Notched Izod Impact Strength (J/m) | 90.7 | 127.6 | 153.2 | 237.0 |
| Energy to max. load (J) | — | 39.6 | 21.2 | 25.3 |
| Energy to failure (J) | — | 48.6 | 26.1 | 38.8 |
| Energy, total (J) | — | 48.7 | 31.8 | 46.0 |
| Maximum load (kN) | — | 4.61 | 3.7 | 4.15 |
| Melt mass-flow (g/10 min) | — | — | — | — |
| Tensile modulus (MPa) | — | 2178 | 2404 | 2330 |
| Tensile stress at yield (MPa) | 67.8 | 65.4 | 68.6 | 66.2 |
| Tensile elongation at yield (%) | — | 4.9 | 4.6 | 4.5 |
| Tensile elongation at break, no Extensometer (%) | 25 | — | — | — |
| Tensile elongation at break (%) | — | 19 | 14 | 16 |

|  | C. Ex. 5 | C. Ex. 6 | C. Ex. 7 | C. Ex. 8 |
|---|---|---|---|---|
| COMPOSITIONS | | | | |
| PPE | 61.00 | 61.00 | 57.83 | 59.98 |
| Zinc sulfide | 0 | 0 | 1.36 | 0.10 |
| Zinc oxide | 0 | 0 | 0.10 | 0.10 |
| Hydrocarbon resin | 3.00 | 3.00 | 2.97 | 2.97 |
| TSAN | 0.10 | 0.10 | 0.10 | 0.10 |
| Polyethylene | 1.50 | 1.00 | 0.99 | 0.99 |
| SEBS 1 | 0 | 0 | 0 | 0 |
| SEBS 2 | 2.00 | 2.00 | 2.18 | 1.98 |
| Phosphite | 0.20 | 0.20 | 0.20 | 0.40 |

TABLE 2-continued

| | | | | |
|---|---|---|---|---|
| Mold release | 0 | 0.40 | 0.40 | 0.40 |
| RDP | 14.42 | 14.42 | 13.85 | 14.47 |
| HIPS | 17.78 | 17.78 | 19.79 | 17.84 |
| HF HIPS | 0 | 0 | 0 | 0 |
| Titanium dioxide | 0.98 | 0.98 | 0 | 0.13 |
| Carbon black | 0.142 | 0.142 | 0.10 | 0 |
| Solvent green 3 | 0 | 0 | 0 | 0 |
| Pigment green 50 | 0.069 | 0.069 | 0 | 0 |
| Pigment red 101 #1 | 0.073 | 0.073 | 0 | 0 |
| Pigment brown 24 | 0.266 | 0.266 | 0.13 | 0.02 |
| Pigment black 11 | 0 | 0 | 0 | 0.50 |
| Pigment red 101 #2 | 0 | 0 | 0.01 | 0.02 |
| total | 101.528 | 101.428 | 100.01 | 100.00 |
| PROPERTIES | | | | |
| Black rings in small part? | No | Yes | Yes | Yes |
| Black rings in large part? | Yes | — | Yes | — |
| Flexural modulus, 3.175 mm (MPa) | — | — | — | — |
| Flexural strength, 3.175 mm (MPa) | — | — | — | — |
| Flexural modulus, 6.35 mm (MPa) | 393,050 | 391,599 | — | — |
| Flexural strength, 6.35 mm (MPa) | 15,084 | 15,084 | — | — |
| Heat deflection temp., 3.175 mm (° C.) | 96.2 | 95.6 | — | — |
| Heat deflection temp., 6.35 mm (° C.) | 103 | 103 | — | — |
| Notched Izod Impact Strength (J/m) | 4.53 | 3.32 | — | — |
| Energy to max. load (J) | 32.5 | 33.7 | — | — |
| Energy to failure (J) | 40.9 | 41.8 | — | — |
| Energy, total (J) | 50.8 | 44.1 | — | — |
| Maximum load (kN) | 4.75 | 4.8 | — | — |
| Melt mass-flow (g/10 min) | — | — | — | — |
| Tensile modulus (MPa) | 337,646 | 336,776 | — | — |
| Tensile stress at yield (MPa) | 9,717 | 9,703 | — | — |
| Tensile elongation at yield (%) | 4.4 | 4.6 | — | — |
| Tensile elongation at break, no Extensometer (%) | — | — | — | — |
| Tensile elongation at break (%) | 16 | 17 | — | — |

| | Ex. 1 | Ex. 2 |
|---|---|---|
| COMPOSITIONS | | |
| PPE | 60.39 | 58.62 |
| Zinc sulfide | 0 | 0.13 |
| Zinc oxide | 0 | 0.13 |
| Hydrocarbon resin | 2.97 | 2.97 |
| TSAN | 0.10 | 0.24 |
| Polyethylene | 1.48 | 0.99 |
| SEBS 1 | 0 | 0.49 |
| SEBS 2 | 1.98 | 0 |
| Phosphite | 0.20 | 0.40 |
| Mold release | 0 | 0.99 |
| RDP | 14.45 | 13.84 |
| HIPS | 17.82 | 20.07 |
| HF HIPS | 0 | 0 |
| Titanium dioxide | 0.39 | 0.99 |
| Carbon black | 0.058 | 0.045 |
| Solvent green 3 | 0 | 0.016 |
| Pigment green 50 | 0.027 | 0 |
| Pigment red 101 #1 | 0.029 | 0 |
| Pigment brown 24 | 0.107 | 0 |
| Pigment black 11 | 0 | 0 |
| Pigment red 101 #2 | 0 | 0 |
| total | 100.000 | 99.921 |
| PROPERTIES | | |
| Black rings in small part? | No | — |
| Black rings in large part? | No | — |
| Flexural modulus, 3.175 mm (MPa) | 353,474 | — |
| Flexural strength, 3.175 mm (MPa) | 14,753 | — |
| Flexural modulus, 6.35 mm (MPa) | — | — |
| Flexural strength, 6.35 mm (MPa) | — | — |
| Heat deflection temp., 3.175 mm (° C.) | 93.4 | — |
| Heat deflection temp., 6.35 mm (° C.) | 102 | — |
| Notched Izod Impact Strength (J/m) | 181.5 | — |
| Energy to max. load (J) | 42.2 | — |
| Energy to failure (J) | 57.3 | — |
| Energy, total (J) | 58.1 | — |
| Maximum load (kN) | 5.0 | — |
| Melt mass-flow (g/10 min) | 22.9 | — |

TABLE 2-continued

| | | |
|---|---|---|
| Tensile modulus (MPa) | 2,207 | — |
| Tensile stress at yield (MPa) | 66.1 | — |
| Tensile elongation at yield (%) | — | — |
| Tensile elongation at break, no Extensometer (%) | 25 | — |
| Tensile elongation at break (%) | — | — |

This written description uses examples to disclose the invention, including the best mode, and also to enable any person skilled in the art to make and use the invention. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal language of the claims.

All cited patents, patent applications, and other references are incorporated herein by reference in their entirety. However, if a term in the present application contradicts or conflicts with a term in the incorporated reference, the term from the present application takes precedence over the conflicting term from the incorporated reference.

All ranges disclosed herein are inclusive of the endpoints, and the endpoints are independently combinable with each other. Each range disclosed herein constitutes a disclosure of any point or sub-range lying within the disclosed range.

The use of the terms "a" and "an" and "the" and similar referents in the context of describing the invention (especially in the context of the following claims) are to be construed to cover both the singular and the plural, unless otherwise indicated herein or clearly contradicted by context. Further, it should further be noted that the terms "first," "second," and the like herein do not denote any order, quantity, or importance, but rather are used to distinguish one element from another. The modifier "about" used in connection with a quantity is inclusive of the stated value and has the meaning dictated by the context (e.g., it includes the degree of error associated with measurement of the particular quantity).

The invention claimed is:

1. A method of reducing esthetic defects in an injection molded article, the method comprising:
   injection molding a poly(arylene ether) composition to form an injection molded article;
   wherein a portion of the injection molded article comprises
      a first dimension of at least 10 centimeters,
      a second dimension of at least 10 centimeters, and
      a third dimension of less than or equal to 1 centimeter;
   wherein the poly(arylene ether) composition comprises
      about 50 to about 70 weight percent of a poly(arylene ether) having an intrinsic viscosity of about 0.3 to about 0.55 deciliter/gram measured at 25° C. in chloroform,
      about 12 to about 30 weight percent of a rubber-modified polystyrene,
      wherein the rubber-modified polystyrene comprises polystyrene and polybutadiene,
      about 5 to about 25 weight percent of an organophosphate ester flame retardant,
      a first colorant and a second colorant, wherein the total amount of all colorants is about 0.3 to about 1 weight percent, and
      about 1 to about 5 weight percent of a hydrocarbon resin selected from the group consisting of aliphatic/aromatic hydrocarbon resins, hydrogenated aliphatic/aromatic hydrocarbon resins, cycloaliphatic hydrocarbon resins, hydrogenated cycloaliphatic hydrocarbon resins, cycloaliphatic/aromatic hydrocarbon resins, hydrogenated cycloaliphatic/aromatic hydrocarbon resins, hydrogenated aromatic hydrocarbon resins, polyterpene resins, terpene-phenol resins, rosins, hydrogenated rosins, rosin esters, hydrogenated rosin esters, coumarone/indene resins, hydrogenated terpene resins, and combinations thereof;
   wherein all weight percents are based on the total weight of the poly(arylene ether) composition.

2. The method of claim 1, wherein the first colorant comprises a white pigment and the second colorant comprises a black pigment.

3. The method of claim 1, wherein the first colorant comprises about 0.25 to about 1.0 weight percent of a white pigment, and the second colorant comprises about 0.04 to about 0.1 weight percent of a carbon black.

4. The method of claim 1, wherein the poly(arylene ether) composition comprises less than or equal to 0.2 weight percent of a poly(ethylene oxide)-poly(propylene oxide) block copolymer.

5. The method of claim 1, wherein the poly(arylene ether) composition further comprises about 0.025 to about 0.4 weight percent of a poly(styrene-acrylonitrile)-encapsulated polytetrafluoroethylene.

6. The method of claim 1, wherein the poly(arylene ether) composition further comprises about 0.5 to about 4 weight percent of an ethylene homopolymer.

7. The method of claim 1, wherein the poly(arylene ether) composition further comprises about 1 to about 4 weight percent of a hydrogenated block copolymer of an alkenyl aromatic compound and a conjugated diene.

8. The method of claim 1, wherein said injection molding comprises using an injection molding machine with a barrel temperature of about 270 to about 310° C. and a mold temperature of about 45 to about 70° C.

9. The method of claim 1, wherein the injection molded article is a case for a lead-acid battery.

10. The method of claim 1, wherein a surface of the injection molded article exhibits CIE 1976 L*a*b* parameters L* of about 25 to about 45, a* of −10 to about 10, and b* of −10 to about 10, determined according to ASTM D2244-09b.

11. The method of claim 1,
   wherein the first colorant comprises about 0.25 to about 1.0 weight percent of a white pigment, and the second colorant comprises about 0.04 to about 0.1 weight percent of a carbon black;
   wherein the poly(arylene ether) composition comprises less than or equal to 0.2 weight percent of a poly(ethylene oxide)-polypropylene oxide) block copolymer;
   wherein the poly(arylene ether) composition further comprises about 0.025 to about 0.4 weight percent of a poly(styrene-acrylonitrile)-encapsulated polytetrafluoroethylene;

wherein the poly(arylene ether) composition further comprises about 0.5 to about 4 weight percent of an ethylene homopolymer;

wherein the poly(arylene ether) composition further comprises about 1 to about 4 weight percent of a hydrogenated block copolymer of an alkenyl aromatic compound and a conjugated diene;

wherein said injection molding comprises using an injection molding machine with a barrel temperature of about 270 to about 310° C. and a mold temperature of about 45 to about 70° C.; and wherein the injection molded article is a case for a lead-acid battery.

12. An injection molded article formed by the method of claim 1.

13. The injection molded article of claim 12, wherein the injection molded article is a case for a lead-acid battery.

14. The method of claim 1, wherein the hydrocarbon resin is selected from the group consisting of hydrogenated cycloaliphatic hydrocarbon resins, hydrogenated terpene resins, and combinations thereof.

* * * * *